(12) United States Patent
Fickes

(10) Patent No.: US 10,271,514 B2
(45) Date of Patent: Apr. 30, 2019

(54) PORTABLE ENCLOSURE FOR PETS

(71) Applicant: MayLay, LLC, Davidson, NC (US)

(72) Inventor: Jason Edward Fickes, Davidson, NC (US)

(73) Assignee: MayLay, LLC, Davidson, NC (US)

(*) Notice: Subject to any disclaimer, the term of this patent is extended or adjusted under 35 U.S.C. 154(b) by 330 days.

(21) Appl. No.: 14/984,878

(22) Filed: Dec. 30, 2015

(65) Prior Publication Data

US 2016/0192613 A1    Jul. 7, 2016

Related U.S. Application Data

(60) Provisional application No. 62/099,738, filed on Jan. 5, 2015.

(51) Int. Cl.
*A01K 1/02* (2006.01)

(52) U.S. Cl.
CPC ............ *A01K 1/029* (2013.01); *A01K 1/0245* (2013.01)

(58) Field of Classification Search
CPC ........ A01K 1/029; A01K 1/0245; A01K 1/03; A01K 1/032; A01K 1/033; B65D 1/24; B65D 43/161; B65D 43/16; B65D 15/18; B65D 25/54; B65D 7/26; B65D 7/24; B65D 2251/0053; B65D 2251/1083
USPC ....... 119/497, 498, 499, 500, 501, 502, 503, 119/504, 513, 514, 515, 473, 474, 482; 220/62.18, 500, 501, 502, 520, 521, 523, 220/524, 529, 530, 531, 532, 5, 33, 534, 220/662, 663, 665; 190/30, 31, 32, 33, 190/34, 107, 108, 109, 116
See application file for complete search history.

(56) References Cited

U.S. PATENT DOCUMENTS

| | | | | |
|---|---|---|---|---|
| 1,549,116 A | * | 8/1925 | Hardesty | A01K 1/0245 220/6 |
| 2,079,458 A | * | 5/1937 | Leichtfuss | B65D 7/26 119/497 |
| 6,352,076 B1 | * | 3/2002 | French | A61D 7/04 119/420 |
| 6,508,358 B2 | * | 1/2003 | Cheng | A45C 13/02 190/111 |
| 8,336,500 B1 | * | 12/2012 | Britt | 119/472 |

* cited by examiner

*Primary Examiner* — Tien Q Dinh
*Assistant Examiner* — Ebony E Evans
(74) *Attorney, Agent, or Firm* — McCarter & English, LLP

(57) ABSTRACT

Improved enclosure assemblies and related methods of use are provided. Exemplary assemblies are configured to house pets, with the assemblies being easily converted to user-friendly transport-sized configurations. The assemblies are adjustable, changeable and/or portable. In general, the enclosure assembly includes a base member having a top side, front side, bottom side and a rear side, with a handle member on the top side. The handle member is configured to allow a user to move/transport the assembly when desired. Exemplary enclosure assemblies include: (i) first and second bottom panel members that are movably secured with respect to the bottom side of the base member, and (ii) first and second end members that are movably secured with respect to the first and second bottom panel members. First and second lid members are movably secured to the top side of the base member to facilitate: (i) assembled configurations, and (ii) transportable configurations.

18 Claims, 4 Drawing Sheets

PORTABLE ENCLOSURE FOR PETS

CROSS-REFERENCE TO RELATED APPLICATIONS

This application claims priority to Provisional Application Ser. No. 62/099,738 filed Jan. 5, 2015, the contents of which is hereby incorporated by reference in its entirety.

FIELD OF THE DISCLOSURE

The present disclosure relates to enclosure assemblies and, more particularly, to adjustable, changeable and/or portable pet enclosure assemblies that are configured and dimensioned to house pets and that are easily converted to user-friendly transport-sized configurations.

BACKGROUND OF THE DISCLOSURE

In general, pet enclosure assemblies and related accessories or the like are known. One problem with certain pet enclosures (e.g., reptile enclosures) is that they are not easily transportable.

For example, a college student who has a pet (e.g., a reptilian pet, such as an iguana) may have a large pet enclosure (e.g., aquarium) set-up to house the pet on campus. During times when the student desires to visit another location for extended periods of time (e.g., parents house during summer or winter school breaks), the college student can be forced to either attempt to transport the large pet enclosure from the campus to the other distant location, or purchase/set-up a second large pet enclosure at the other distant location, so that the student can take the pet with them during their travels. As such, it is noted that a need exists among manufacturers to develop pet enclosure assemblies that are cost-effective and/or include improved features/structures.

Thus, an interest exists for improved enclosure assemblies, and related methods of use. These and other inefficiencies and opportunities for improvement are addressed and/or overcome by the assemblies, systems and methods of the present disclosure.

SUMMARY OF THE DISCLOSURE

The present disclosure provides advantageous enclosure assemblies (e.g., pet enclosure assemblies). More particularly, the present disclosure provides advantageous pet enclosure assemblies (e.g., adjustable, changeable and/or portable pet enclosure assemblies) that are configured and dimensioned to house pets and that are easily converted to user-friendly transport-sized configurations.

In certain embodiments, the present disclosure provides for an enclosure assembly including a base member having a top side, front side, bottom side and a rear side, with a handle member mounted with respect to the top side of the base member. In general, the handle member is configured to allow a user to move/transport the enclosure assembly when desired.

In exemplary embodiments, the enclosure assembly includes first and second bottom panel members that are movably secured (e.g., via one or more hinges) with respect to the bottom side of the base member. Exemplary enclosure assemblies also include first and second end members that are movably secured with respect to the first and second bottom panel members, respectively. First and second lid members are movably secured to the top side of the base member to facilitate: (i) assembled configurations, and (ii) transportable configurations.

The present disclosure provides for an enclosure assembly including a base member having a top side, front side, bottom side and a rear side; a handle member mounted with respect to the base member; first and second bottom panel members movably secured with respect to the base member; a first end member movably secured with respect to the first bottom panel member, and a second end member movably secured with respect to the second bottom panel member; and first and second lid members movably secured with respect to the base member; wherein the first and second bottom panel members, the first and second end members, and the first and second lid members are configured to be moved by a user to a first position to allow the user to position: (i) two window members relative to the first bottom panel member and the first end member, and (ii) two window members relative to the second bottom panel member and the second end member; and wherein the first and second lid members are configured to be moved by a user to a second position to allow the user to position: (i) the first lid member releasably secured to the first end member to define an enclosed space between the first lid member and the two window members positioned relative to the first bottom panel member and the first end member, and (ii) the second lid member releasably secured to the second end member to define an enclosed space between the second lid member and the two window members positioned relative to the second bottom panel member and the second end member.

The present disclosure also provides for an enclosure assembly wherein the first and second lid members are configured to be moved by a user to a third position to allow the user to: (i) remove the two window members away from the first bottom panel member and the first end member, and (ii) remove the two window members away from the second bottom panel member and the second end member, (iii) fold the first and second end members proximal to the first and second bottom panel members, and (iv) fold the first and second bottom panel members, along with the folded first and second end members, proximal to the base member; and wherein the first and second lid members are configured to be moved by a user to a fourth position to allow the user to fold the first and second lid members proximal to the base member to define a transportable configuration for the user.

The present disclosure also provides for an enclosure assembly wherein the handle member is mounted with respect to the top side of the base member. The present disclosure also provides for an enclosure assembly wherein the first and second bottom panel members are movably secured, via one or more hinges, to the bottom side of the base member.

The present disclosure also provides for an enclosure assembly wherein the first end member is movably secured, via one or more hinges, to a terminal end of the first bottom panel member, and the second end member is movably secured, via one or more hinges, to a terminal end of the second bottom panel member.

The present disclosure also provides for an enclosure assembly wherein the first and second lid members are movably secured, via one or more hinges, to the top side of the base member. The present disclosure also provides for an enclosure assembly wherein the one or more hinges are double metal hinges.

The present disclosure also provides for an enclosure assembly wherein the first and second end members each include a middle portion that includes a substantially transparent material. The present disclosure also provides for an enclosure assembly wherein the first and second lid members each include a middle portion that includes a substantially transparent material. The present disclosure also provides for an enclosure assembly wherein the substantially transparent material is a screen or mesh material. The present disclosure also provides for an enclosure assembly wherein the substantially transparent material is a screen or mesh material.

The present disclosure also provides for an enclosure assembly wherein the first and second end members each include a recess, and the first and second lid members each include a mating feature, with each mating feature being configured and dimensioned to releasably and securely mate with a recess.

The present disclosure also provides for an enclosure assembly wherein the first and second bottom panel members and the first and second end members each include a groove to at least partially house one of the window members.

The present disclosure also provides for an enclosure assembly wherein when the first and second lid members are moved to the fourth position, the base member defines an interior cavity that at least partially houses the first and second end members. The present disclosure also provides for an enclosure assembly wherein the interior cavity is configured and dimensioned to house user supplies.

The present disclosure also provides for an enclosure assembly wherein the rear side of the base member includes a slit that is configured and dimensioned to allow a divider member to be positioned within the base member via the slit, thereby providing two separate enclosed areas after the divider member is positioned within the base member via the slit. The present disclosure also provides for an enclosure assembly wherein the bottom side and the interior of the front side of the base member includes a notch that is configured to house at least a portion of the divider member.

The present disclosure also provides for a method for fabricating a pet enclosure assembly including providing a base member having a top side, front side, bottom side and a rear side; mounting a handle member with respect to the base member; movably securing first and second bottom panel members with respect to the base member; movably securing a first end member with respect to the first bottom panel member, and movably securing a second end member with respect to the second bottom panel member; movably securing first and second lid members with respect to the base member; moving the first and second bottom panel members, the first and second end members, and the first and second lid members to a first position to allow a user to position: (i) two window members relative to the first bottom panel member and the first end member, and (ii) two window members relative to the second bottom panel member and the second end member; and moving the first and second lid members to a second position to allow the user to: (i) releasably secure the first lid member to the first end member to define an enclosed space between the first lid member and the two window members positioned relative to the first bottom panel member and the first end member, and (ii) releasably secure the second lid member to the second end member to define an enclosed space between the second lid member and the two window members positioned relative to the second bottom panel member and the second end member.

The present disclosure also provides for a method for fabricating a pet enclosure assembly including moving the first and second lid members to a third position to allow the user to: (i) remove the two window members away from the first bottom panel member and the first end member, and (ii) remove the two window members away from the second bottom panel member and the second end member, (iii) fold the first and second end members proximal to the first and second bottom panel members, and (iv) fold the first and second bottom panel members, along with the folded first and second end members, proximal to the base member; and moving the first and second lid members to a fourth position to allow the user to fold the first and second lid members proximal to the base member to define a transportable configuration for the user.

The present disclosure also provides for a pet enclosure assembly including a base member having a top side, front side, bottom side and a rear side; a handle member mounted with respect to the top side of the base member; first and second bottom panel members movably secured, via one or more hinges, to the bottom side of the base member; a first end member movably secured, via one or more hinges, to a terminal end of the first bottom panel member, and a second end member movably secured, via one or more hinges, to a terminal end of the second bottom panel member; and first and second lid members movably secured, via one or more hinges, to the top side of the base member; wherein the first and second bottom panel members, the first and second end members, and the first and second lid members are configured to be moved by a user to a first position to allow the user to position: (i) two window members relative to the first bottom panel member and the first end member, and (ii) two window members relative to the second bottom panel member and the second end member; wherein the first and second lid members are configured to be moved by a user to a second position to allow the user to position: (i) the first lid member releasably secured to the first end member to define an enclosed space between the first lid member and the two window members positioned relative to the first bottom panel member and the first end member, and (ii) the second lid member releasably secured to the second end member to define an enclosed space between the second lid member and the two window members positioned relative to the second bottom panel member and the second end member; wherein the first and second lid members are configured to be moved by a user to a third position to allow the user to: (i) remove the two window members away from the first bottom panel member and the first end member, and (ii) remove the two window members away from the second bottom panel member and the second end member, (iii) fold the first and second end members proximal to the first and second bottom panel members, and (iv) fold the first and second bottom panel members, along with the folded first and second end members, proximal to the base member; and wherein the first and second lid members are configured to be moved by a user to a fourth position to allow the user to fold the first and second lid members proximal to the base member to define a transportable configuration for the user.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

Figure 1:
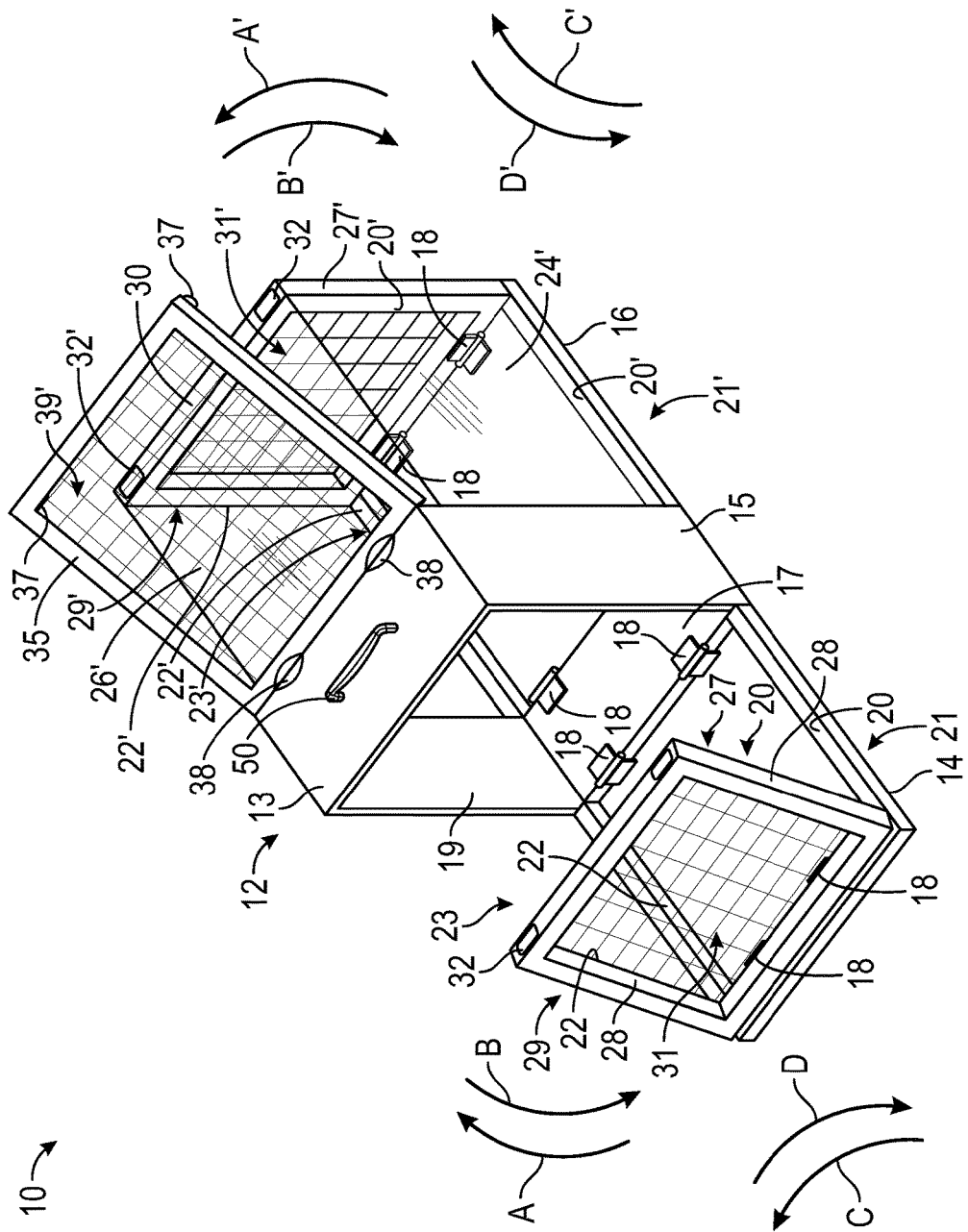
FIG. 1 is a partial front perspective view of an exemplary enclosure assembly according to the present disclosure, with a lid member and certain window members removed for ease of review.

The exemplary embodiments disclosed herein are illustrative of advantageous enclosure assemblies (e.g., pet enclosure assemblies), and systems of the present disclosure and methods/techniques thereof. It should be understood, however, that the disclosed embodiments are merely exemplary of the present disclosure, which may be embodied in various forms. Therefore, details disclosed herein with reference to exemplary enclosure assemblies/fabrication methods and associated processes/techniques of assembly and use are not to be interpreted as limiting, but merely as the basis for teaching one skilled in the art how to make and use the advantageous enclosure assemblies/systems and/or alternative enclosure assemblies of the present disclosure.

The present disclosure provides improved enclosure assemblies (e.g., pet enclosure assemblies), and related methods of use. More particularly, the present disclosure provides improved enclosure assemblies that are configured and dimensioned to house one or more pets, with the pet enclosure assemblies being easily converted to user-friendly transport-sized configurations. In exemplary embodiments, the enclosure assemblies are adjustable, changeable and/or portable.

Current practice provides that conventional pet enclosure assemblies can make it difficult, expensive and/or inconvenient to retain and/or transport pets. For example, a user may have a pet in an enclosure (large/complex enclosure) that is set-up at a first location. When that user desires to visit another location (e.g., a student returning home for an extended period of time) the user can be forced to either attempt to transport the previously set-up pet enclosure (e.g., large/complex enclosure) from the first location to the other location, or be forced to purchase/set-up a second pet enclosure at the other distant location, so that the user can take the pet with them during their travels.

In exemplary embodiments, the present disclosure provides for advantageous pet enclosure assemblies (e.g., adjustable, changeable and/or portable pet enclosure assemblies) that are configured and dimensioned to house pets and that are easily converted to user-friendly transport-sized configurations, and related methods of use, thereby providing a significant operational, commercial and/or manufacturing advantage as a result. By providing such advantageous portable enclosure assemblies, users can quickly and easily transport their enclosure assembly from one location to another without experiencing the complications noted above.

Referring now to the drawings, like parts are marked throughout the specification and drawings with the same reference numerals, respectively. Drawing figures are not necessarily to scale and in certain views, parts may have been exaggerated for purposes of clarity.

With reference to FIG. 1-5, there is illustrated an exemplary embodiment of an enclosure assembly 10 according to the present disclosure. In general, enclosure assembly 10 is configured and dimensioned to house/retain and/or transport pets or the like (e.g., reptilian pets or other types of pets/organisms). It is noted that enclosure assembly 10 can house and/or transport other items/materials as well.

In certain embodiments, enclosure assembly 10 is configured to house one or more small to medium sized pets (e.g., reptilian pets) in a mostly dry environment, although the present disclosure is not limited thereto. Rather, it is noted that assembly 10 can be configured to house a variety of organisms/items in a variety of different environments.

As discussed in further detail below, enclosure assembly 10 is adjustable, changeable and/or portable, and can easily convert to user-friendly transport-sized configurations (e.g., a briefcase-sized configuration for easy transport). In some embodiments, enclosure assembly 10 can be divided into two separate spaces (e.g., separate living spaces), with each separate space configured to house one or more pets/items.

As shown in FIGS. 1-5, enclosure assembly 10 typically includes a base member 12 (e.g., central or center base/console member 12), and a handle member 50 that is mounted with respect to base member 12. As discussed further below, handle member 50 is configured to allow a user to move/transport assembly 10 when desired (e.g., when assembly 10 is converted to a user-friendly transport-sized configuration (FIG. 5), or even when assembly is fully assembled (FIG. 3)).

Exemplary handle member 50 takes the form of an elongated handle member 50. However, it is noted that handle member 50 can take a variety of other forms/shapes. Exemplary handle member 50 typically is mounted to top side 13 of base member 12. Base member 12 can also include front side 15, bottom side 17 and rear side 19. Exemplary base member 12 takes the form of a substantially square or substantially rectangular base member 12, although the present disclosure is not limited thereto. Rather, base member 12 can take a variety of other forms, shapes (e.g., polygonal shapes) and/or designs, and include any number of sides.

In certain embodiments, the dimensions for top side 13 are about 24"×6"×0.5". Exemplary dimensions for front and rear sides 15, 19 are about 23"×4"×0.5", and for bottom side 17 are about 24"×4"×0.5". In general, base member 12 provides stability to enclosure assembly 10 and has no or very few moving parts. Sides 13, 15, 17 and 19 can be secured together in a fixed position (FIG. 1). It is noted that sides 13, 15, 17 and 19 can be fabricated from a variety of suitable materials (e.g., durable epoxy/plastic resin, coated metal, metal-based materials, plastic-based materials, wood-based materials, etc.).

As shown in FIGS. 1-5, enclosure assembly 10 typically includes a first bottom panel member 14 and a second bottom panel member 16. Each exemplary bottom panel member 14, 16 is movably secured with respect to base member 12. More particularly and in one embodiment, one or more hinges 18 secure first bottom panel member 14 to bottom side 17 of base member 12, and one or more hinges 18 secure second bottom panel member 16 to bottom side 17 of base member 12 (FIG. 1).

As such and as shown in FIG. 1, first bottom panel member 14 can move in the direction of arrow A toward top side 13 of base member 12, and can also move in the direction of arrow B toward bottom side 17 of base member 12, via the one or more hinges 18. Similarly, second bottom panel member 16 can move in the direction of arrow A' toward top side 13 of base member 12, and can also move in the direction of arrow B' toward bottom side 17 of base member 12, via the one or more hinges 18.

Exemplary dimensions for first and second bottom panel members 14, 16 are about 24"×22"×0.5". It is noted that first and second bottom panel members 14, 16 can be fabricated from a variety of suitable materials (e.g., durable epoxy/plastic resin, coated metal, metal-based materials, plastic-based materials, wood-based materials, etc.).

Figure 3:
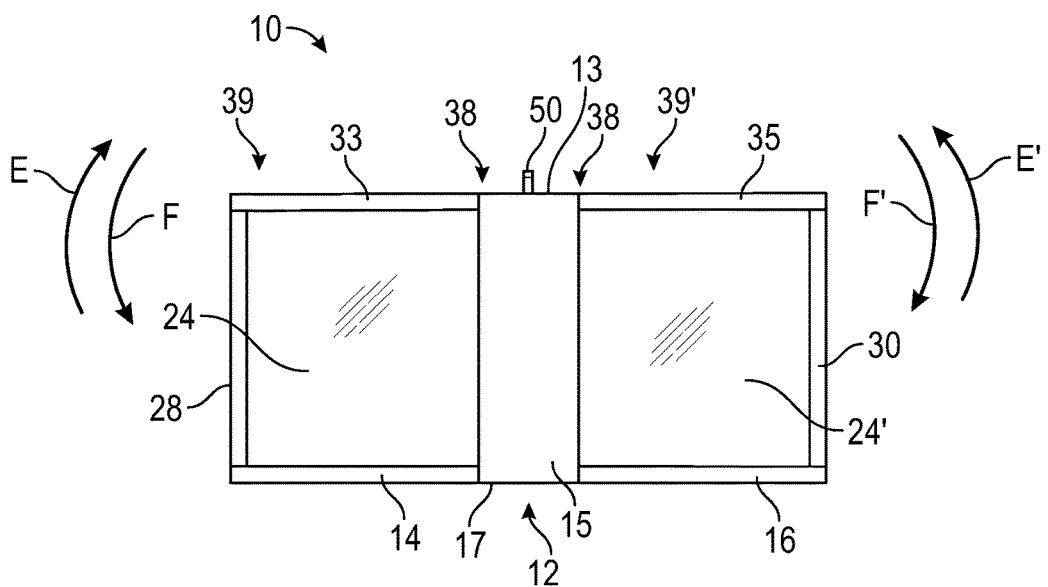

As discussed in further detail below, front and rear edges 21, 23 of first bottom panel member 14 can include grooves or channels 20, 22, respectively, with each groove 20, 22 configured to house a portion of window members 24, 26, respectively (FIGS. 1 and 3). Similarly, front and rear edges 21', 23' of second bottom panel member 16 can include grooves or channels 20', 22', respectively, with each groove 20', 22' configured to house a portion of window members 24', 26', respectively (FIGS. 1 and 3). Window members 24, 24', 26, 26' can be fabricated from a variety of suitable materials (e.g., plexi-glass, glass, etc.).

Figure 2:
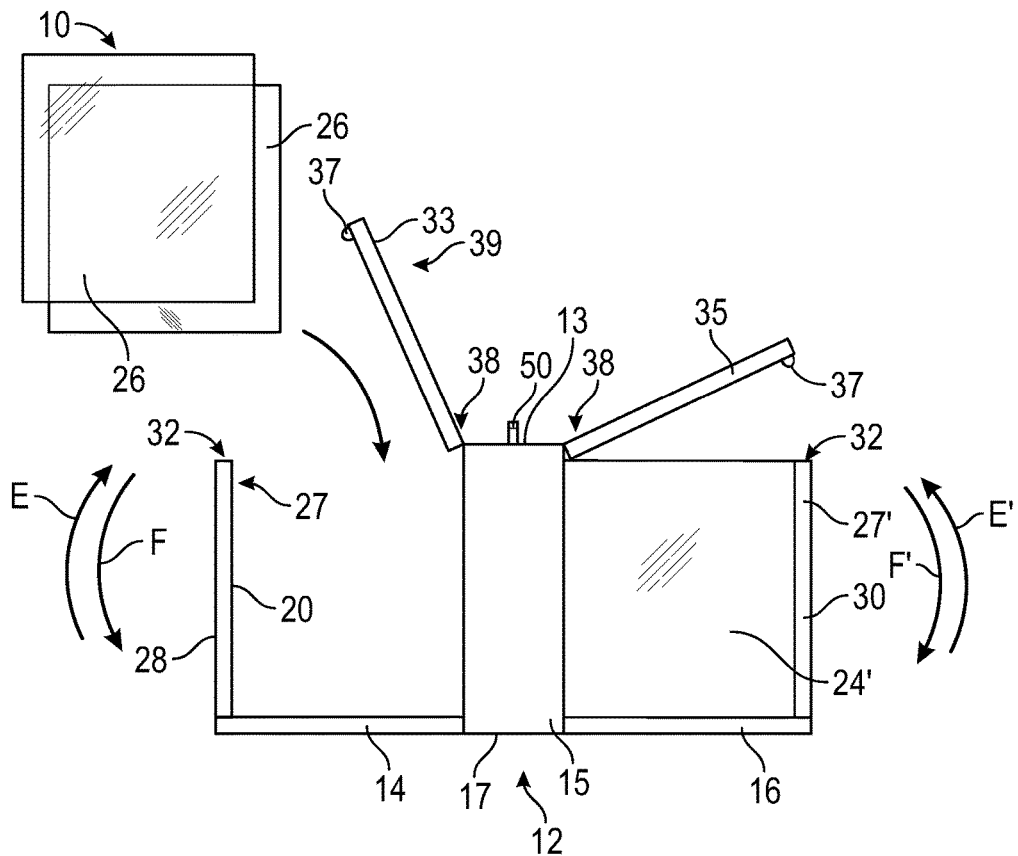
FIGS. 2-3 are front views of an exemplary enclosure assembly, during various stages of assembly.

In exemplary embodiments, enclosure assembly 10 includes a first end member 28 and a second end member 30. Exemplary first end member 28 is movably secured (e.g., via one or more hinges 18) with respect to the terminal end of the first bottom panel member 14, and second end member 30 is movably secured (e.g., via one or more hinges 18) with respect to the terminal end of the second bottom panel member 16 (FIGS. 1-3).

As such and as shown in FIG. 1, first end member 28 can move in the direction of arrow C away from first bottom panel member 14, and can also move in the direction of arrow D toward first bottom panel member 14, via the one or more hinges 18. Similarly, second end member 30 can move in the direction of arrow C' away from second bottom panel member 16, and can also move in the direction of arrow D' toward second bottom panel member 16, via the one or more hinges 18.

Exemplary dimensions for first and second end members 28, 30 are about 24"×24"×0.5". It is noted that first and second end members 14, 16 can be fabricated (in whole or in part) from a variety of suitable materials (e.g., durable epoxy/plastic resin, coated metal, metal-based materials, plastic-based materials, wood-based materials, etc.). In exemplary embodiments, first and second end members 28, 30 include a middle portion 31, 31' that has been cut-out/framed and replaced with a substantially transparent material 31, 31' (e.g, glass, screen material, mesh, metal mesh, wire, woven material, etc.). It is noted that when middle portions 31, 31' include screen and/or mesh material, this provides air flow to assembled enclosure assembly 10 (FIG. 3).

In one embodiment, middle portions 31, 31' substantially encompass the internal area of the end members 28, 30 about 2" from the edges of the end members 28, 30 (e.g., the framed/windowed edges extend about 2" inwards from the outer edges of the end members 28, 30 and are fabricated from plastic/metal/wood, while the cut-out middle portions 31, 31' include the transparent/screened/meshed material and extend from the framed/windowed edges and substantially cover the internal area of the end members 28, 30).

The top side of each first and second end members 28, 30 can also include one or more recesses or cavities 32 (e.g., 0.25" in diameter and 1.5 cm deep). As discussed further below, each recess/cavity 32 is configured to releasably and securedly mate with a mating feature 37 (e.g., securing rod or guiding dowel 37) of lid members 33, 35.

As discussed further below, front and rear edges 27, 29 of first end member 28 can include grooves or channels 20, 22, respectively, with each groove 20, 22 configured to house a portion of window members 24, 26, respectively (FIGS. 1-3). Similarly, front and rear edges 27', 29' of second end member 30 can include grooves or channels 20', 22', respectively, with each groove 20', 22' configured to house a portion of window members 24', 26', respectively (FIGS. 1-3).

In exemplary embodiments, enclosure assembly 10 includes a first lid member 33 and a second lid member 35. Exemplary first lid member 33 is movably secured (e.g., via one or more double metal hinges 38) with respect to the top side 13 of the base member 12, and second lid member 35 is movably secured (e.g., via one or more double metal hinges 38) with respect to the top side 13 of the base member 12 (FIGS. 1-3). Double hinges 38 allow each lid member 33, 35 to move up or down as described below.

Figure 5:
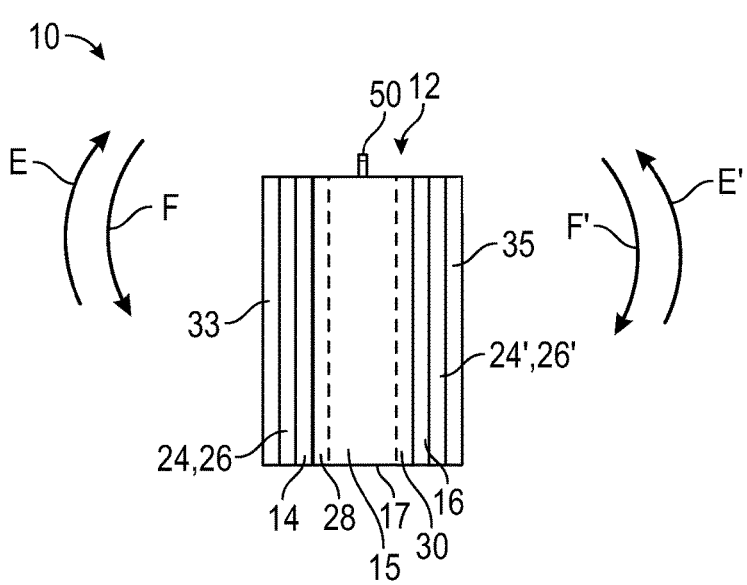
FIG. 5 is a front view of an exemplary enclosure assembly, after assembly for travel.

As such and as shown in FIGS. 2-3 and 5, first lid member 33 can move in the direction of arrow E away from bottom side 17 of base member 12, and can also move in the direction of arrow F toward bottom side 17 of base member 12, via the one or more hinges 38. Similarly, second lid member 35 can move in the direction of arrow E' away from bottom side 17 of base member 12, and can also move in the direction of arrow F' toward bottom side 17 of base member 12, via the one or more hinges 38.

Exemplary dimensions for first and second lid members 33, 35 are about 24"×21"×0.5". It is noted that first and second lid members 33, 35 can be fabricated (in whole or in part) from a variety of suitable materials (e.g., durable epoxy/plastic resin, coated metal, metal-based materials, plastic-based materials, wood-based materials, etc.). In exemplary embodiments, first and second lid members 33, 35 include a middle portion 39, 39' that has been cut-out/framed and replaced with a substantially transparent material 39, 39' (e.g, glass, screen material, mesh, metal mesh, wire, woven material, flame-retardant screen material, etc.). It is noted that when middle portions 39, 39' include screen and/or mesh material, this provides air flow to assembled enclosure assembly 10 (FIG. 3).

In one embodiment, middle portions 39, 39' substantially encompass the internal area of the lid members 33, 35 about 2" from the edges of the lid members 33, 35 (e.g., the framed/windowed edges extend about 2" inwards from the outer edges of the lid members 33, 35 and are fabricated from plastic/metal/wood, while the cut-out middle portions 39, 39' include the transparent/screened/meshed material and extend from the framed/windowed edges and substantially cover the internal area of the lid members 33, 35).

In one embodiment, middle portions 39, 39' include flame-retardant screen material 39, 39'. As such, if a heat/light source (e.g., basking lamp) is placed on or near middle portions 39, 39' of lid members 33, 35, the middle portions 39, 39' will be flame-retardant to such heat/light sources.

Each lid member 33, 35 can include one or more mating feature 37 (e.g., securing rod or guiding dowel 37). In exemplary embodiments and as discussed below, each mating feature 37 is configured and dimensioned to releasably and securedly mate with a recess/cavity 32 of first and second end members 28, 30. Alternatively, it is noted that each lid member 33, 35 can include one or more recess/cavity 32, and each first and second end members 28, 30 can include one or more mating feature 37, with each mating feature 37 being configured and dimensioned to releasably and securedly mate with a recess/cavity 32.

In exemplary embodiments, to set-up the enclosure assembly 10 for the first time, a user would first obtain (e.g., from a store) the enclosure assembly 10 as shown in FIG. 5. The user would then move the first and second lid members 33, 35 in the direction of arrows E, E' so that the lid members 33, 35 were in a position similar to that shown in FIG. 2 (or raised higher—FIG. 4).

Figure 4:
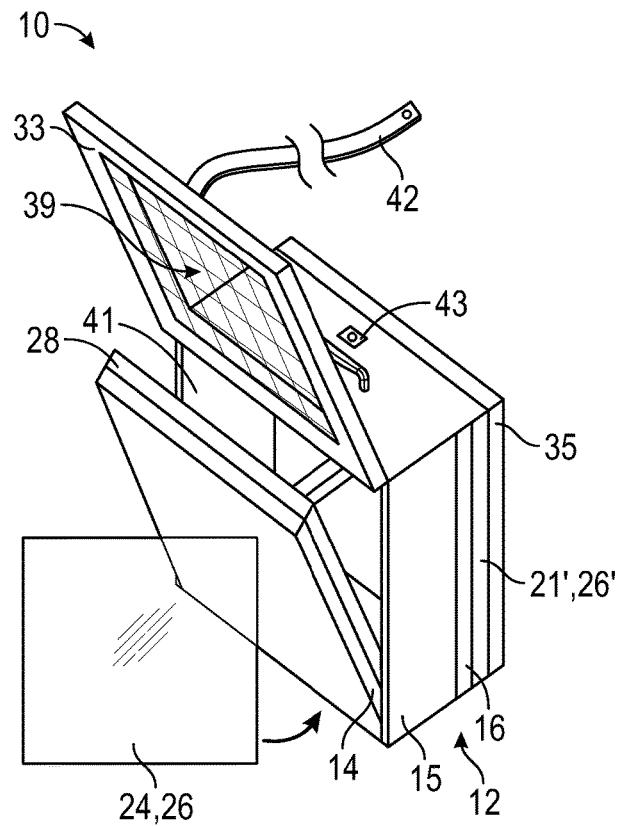
FIG. 4 is another front perspective view of the enclosure assembly of FIG. 1, during partial assembly for travel.

The user would then move the first and second bottom panel members 14, 16 (along with end members 28, 30 folded proximal to members 14, 16—FIGS. 4-5) in the direction of arrows B, B' so that the bottom panel members 14, 16 were in a position similar to that shown in FIG. 2 (with the end members 28, 30 still folded proximal to bottom panel members 14, 16).

The user would then move the first and second end members 28, 30 in the direction of arrows C, C' so that the first and second end members 28, 30 were in a position similar to that shown in FIG. 2.

A user would then slide/position the window members 24, 26 into the grooves 20, 22 of first end member 28 and first bottom panel member 14, and would also slide/position the window members 24', 26' into the grooves 20', 22' of second end member 30 and second bottom panel member 16 until the window members 24, 24', 26, 26' were in a position similar to that shown in FIG. 3.

Next, a user would then move the first and second lid members 33, 35 in the direction of arrows F, F' until the lid members 33, 35 were in a position similar to that shown in FIG. 3, with the mating features 37 of each lid member 33, 35 securedly and releasably mounting to the recesses 32 of each end member 28, 30. As such and as shown in FIG. 3, assembled enclosure assembly 10 would then be available to house one or more pets, as desired by a user.

Figure 6:
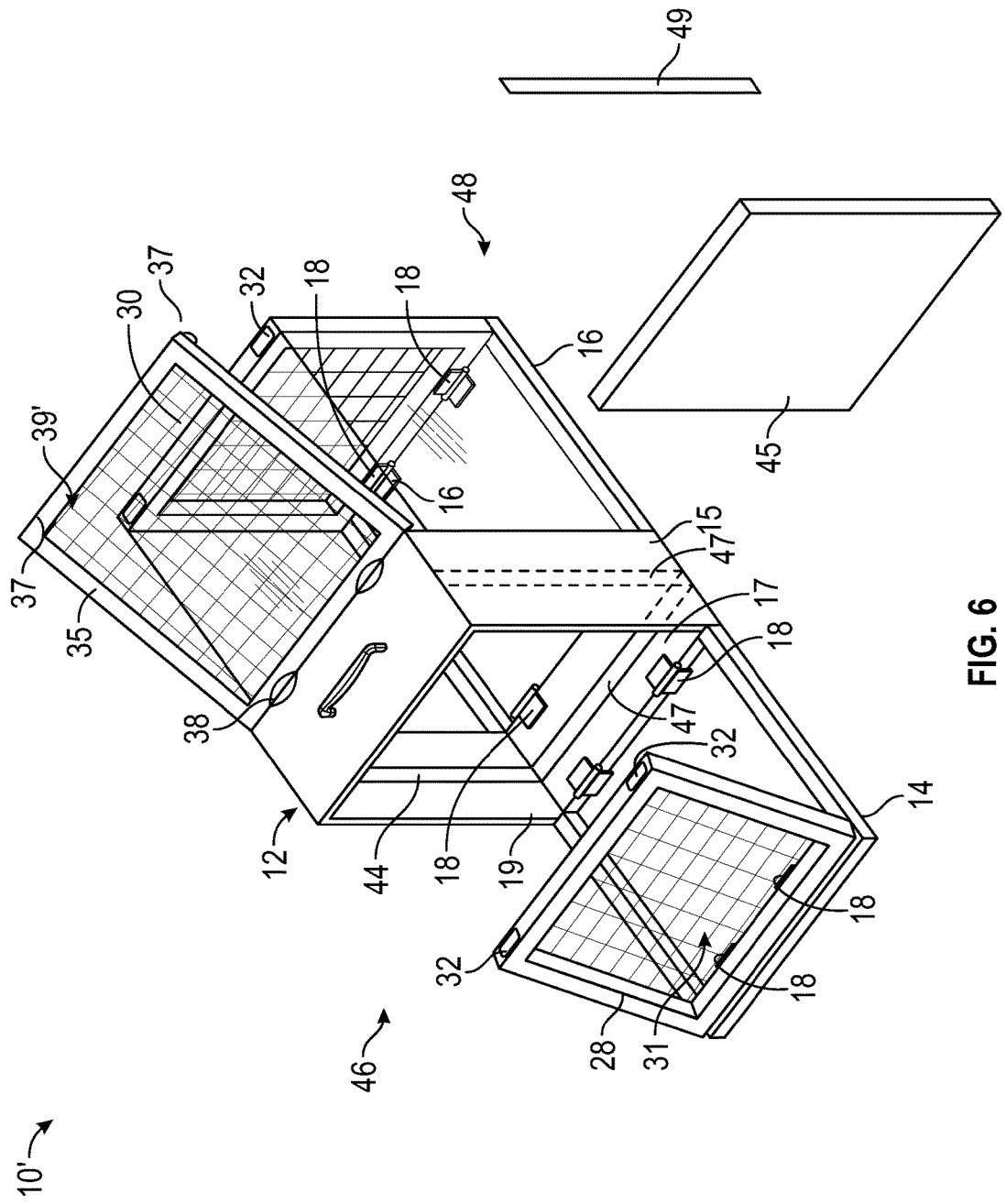
FIG. 6 is a partial front perspective view of another exemplary enclosure assembly according to the present disclosure, with a lid member and certain window members removed for ease of review.

In some embodiments and as shown in FIG. 6, the rear side 19 of base member 12 of assembly 10' can include a slit 44 (e.g., a slit about 0.25" wide and about 23.5" long). Slit 44 is configured and dimensioned to allow a divider member 45 to separate assembly 10' into two separate enclosed areas 46, 48 (e.g., when assembly is in the position shown in FIG. 3). Divider member 45 can be fabricated from a variety of suitable materials (e.g., plastic, glass, wood, plexi-glass, solid wood composite, metal, combinations thereof, etc.).

For example and as shown in FIG. 6, the bottom side 17 and the interior of the front side 15 of the base member 12 can include a notch/groove 47 (e.g., a 0/25" wide and 0.25" deep notch/groove 47). Exemplary notch/groove 47 is configured to house at least a portion of the divider member 45 (e.g, act as a rail for the notch/groove 47) when the divider member 45 is positioned within cavity 41 (FIG. 4) of base member 12 via slit 44.

After divider member 45 is positioned within cavity 41 of base member 12 via slit 44 and housed, at least in part, via notch/groove 47 of the bottom side 17 and the interior of the front side 15 of the base member 12, the assembly 10 then advantageously provides two separate enclosed areas 46, 48 (e.g., when assembly 10' is in the position shown in FIG. 3, and divider member 45 is in cavity 41). As such, a user can then house two different types of animals/organism or the like in each separate enclosed area 46, 48.

For example, area 46 can house at least one pet/organism having a first set of desired environmental conditions (e.g., heat/light/humidity/food/water/predator/prey, etc., requirements), and area 48 can house at least one other pet/organism having a second (e.g., different) set of desired environmental conditions (e.g., heat/light/humidity/food/water/predator/prey, etc., requirements).

In exemplary embodiments, when divider member 45 is not positioned in cavity 41 to provide two separate enclosed areas 46, 48, a cover member 49 (FIG. 6) can be positioned, secured and/or mounted with respect to the slit 44 to cover the slit 44 (e.g., to act as a debris deterrent and/or prevent food/waste from escaping the base member 12).

After setting up the assembled enclosure assembly 10 as shown in FIG. 3, it is noted that the user may desire to convert the assembly 10 to a transportable configuration (FIG. 5).

For example, the user may be a college student who has a pet (e.g., a reptilian pet, such as an iguana) housed within assembled enclosure assembly 10, with the assembly 10 set-up to house the pet on campus (FIG. 3). If the user desires to visit another location for extended periods of time (e.g., parents house during summer or winter school breaks), the user can take the pet out of the assembly 10 and place it in a travel carrier or the like, and then re-configure the assembly 10 into a transportable configuration 10 (FIG. 5). The user can then easily travel with transportable configuration 10 (FIG. 5) to the desired destination, and then re-set-up the assembly 10 as discussed above to achieve an assembled enclosure assembly 10 (FIG. 3) at the new location. The user can then place the pet back in the re-set-up assembly 10 until the user desires to leave (and can then position the assembly 10 into the transportable configuration, return to school, and then re-set-up the assembly 10 once again when back at school).

As such and after setting up the assembled enclosure assembly 10 as shown in FIG. 3, to re-configure the assembly 10 to a transportable configuration (FIG. 5), the user would first move the first and second lid members 33, 35 in the direction of arrows E, E' until the lid members 33, 35 were in a position similar to that shown in FIG. 2 (or higher), with the mating features of each lid member 33, 35 thereby being released from the recesses 32 of each end member 28, 30.

As user would then slide/move the window members 24, 26 out of the grooves 20, 22 of first end member 28 and first bottom panel member 14, and would also slide/move the window members 24', 26' out of the grooves 20', 22' of second end member 30 and second bottom panel member 16 until the window members 24, 24', 26, 26' were removed from assembly 10.

The user would then move the first and second end members 28, 30 in the direction of arrows D, D' so that the first and second end members 28, 30 folded down proximal to bottom panel members 14, 16.

The user would then move the first and second bottom panel members 14, 16 (along with end members 28, 30 folded proximal to members 14, 16—FIG. 4) in the direction of arrows A, A' until the bottom panel members 14, 16 and end members 28, 30 were in a position similar to that shown in FIG. 5, with at least a portion of the end members 28, 30 positioned within interior cavity 41 of base member 12 (FIGS. 4 and 5) in some embodiments. In this regard, it is noted that interior cavity 41 of base member 12 can also be configured and dimensioned to house other supplies/items (e.g., pet supplies, food bowls, etc.) when assembly 10 is in the transportable configuration 10 shown in FIG. 5.

Next, a user would move the first and second lid members 33, 35 in the direction of arrows F, F' so that the lid members 33, 35 were in a position similar to that shown in FIG. 5. Assembly 10 would then be in the transportable configuration 10 shown in FIG. 5, and could be transported easily by the user, as desired (and then re-set-up at various locations, as desired by the user).

In some embodiments, during/after moving the lid members 33, 35 in the direction of arrows F, F' to the position shown in FIG. 5, a user can position the window members 24, 26 between the first lid member 33 and the first bottom member 14, and position the window members 24', 26' between the second lid member 35 and the second bottom member 16, as shown in FIGS. 4 and 5. The first and/or second lid member 33, 35 can include one or more strap members 42 or the like (FIG. 4), with the strap member 42 configured to wrap around the assembly 10 of FIG. 5 and mount to a mounting member 43 (FIG. 4) on base member 12. As such, window members 24, 24', 26, 26' can be secured to assembly 10 for transport purposes.

Alternatively, window members 24, 24', 26, 26' can be transported separately (e.g., within a bag or some other carrier, or transported separately) from transportable configuration 10.

In other embodiments, it is noted that the user may wish to configure the assembled enclosure assembly 10 into other housing/transportable configurations. For example, the user may only want to position the first end member 28, first bottom panel member 14 and first lid member 33 in the position shown in FIG. 5, while keeping the second end member 30, second bottom panel member 16 and second lid member 35 in the position shown in FIG. 3. As such, the user could let the pet remain in the set-up and enclosed portion (e.g., right side of FIG. 3) when housing the pet and/or travelling with the assembly 10.

Likewise, the user may only want to position the second end member 30, second bottom panel member 16 and second lid member 35 in the position shown in FIG. 5, while keeping the first end member 28, first bottom panel member 14 and first lid member 33 in the position shown in FIG. 3. As such, the user could let the pet remain in the set-up and enclosed portion (e.g., left side of FIG. 3) when housing the pet and/or travelling with the assembly 10.

Whereas the disclosure has been described principally in connection with enclosure assemblies for pets (e.g., reptilian pets), such description has been utilized only for purposes of disclosure and is not intended as limiting the disclosure. To the contrary, it is to be recognized that the disclosed enclosure assemblies are capable of use for other uses/purposes (e.g., as enclosure assemblies for organisms (e.g., mammals, birds, etc.) or other items/materials, and/or as enclosure assemblies for other recreational, domestic and/or commercial uses/purposes).

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. An enclosure assembly comprising:
a base member having a top side, front side, bottom side and a rear side;
a handle member mounted with respect to the base member;
first and second bottom panel members movably secured with respect to the base member;
a first end member movably secured with respect to the first bottom panel member, and a second end member movably secured with respect to the second bottom panel member; and
first and second lid members movably secured, via one or more hinges, to the top side of the base member;
wherein the first and second bottom panel members, the first and second end members, and the first and second lid members are configured to be moved by a user to a first position to allow the user to position: (i) first and second window members relative to the first bottom panel member and the first end member, and (ii) third and fourth window members relative to the second bottom panel member and the second end member; and
wherein the first and second lid members are configured to be moved by a user to a second position to allow the user to position: (i) the first lid member releasably secured to the first end member to define an enclosed space between the first lid member and the first and second window members positioned relative to the first bottom panel member and the first end member, and (ii) the second lid member releasably secured to the second end member to define an enclosed space between the second lid member and the third and fourth window members positioned relative to the second bottom panel member and the second end member.

2. The assembly of claim 1, wherein the first and second lid members are configured to be moved by a user to a third position to allow the user to: (i) remove the first and second window members away from the first bottom panel member and the first end member, and (ii) remove the third and fourth window members away from the second bottom panel member and the second end member, (iii) fold the first and second end members proximal to the first and second bottom panel members, and (iv) fold the first and second bottom panel members, along with the folded first and second end members, proximal to the base member; and
wherein the first and second lid members are configured to be moved by a user to a fourth position to allow the user to fold the first and second lid members proximal to the base member to define a transportable configuration for the user.

3. The assembly of claim 2, wherein when the first and second lid members are moved to the fourth position, the base member defines an interior cavity that at least partially houses the first and second end members.

4. The assembly of claim 1, wherein the handle member is mounted with respect to the top side of the base member.

5. The assembly of claim 1, wherein the first and second bottom panel members are movably secured, via one or more hinges, to the bottom side of the base member.

6. The assembly of claim 1 wherein the first end member is movably secured, via one or more hinges, to a terminal end of the first bottom panel member, and the second end member is movably secured, via one or more hinges, to a terminal end of the second bottom panel member.

7. The assembly of claim 1, wherein the one or more hinges are double metal hinges.

8. The assembly of claim 1, wherein the first and second end members each include a middle portion that includes a substantially transparent material.

9. The assembly of claim 8, wherein the substantially transparent material is a screen or mesh material.

10. The assembly of claim 1, wherein the first and second lid members each include a middle portion that includes a substantially transparent material.

11. The assembly of claim 10, wherein the substantially transparent material is a screen or mesh material.

12. The assembly of claim 1, wherein the first and second end members each include a recess, and the first and second lid members each include a mating feature, with each mating feature being configured and dimensioned to releasably and securely mate with a recess.

13. The assembly of claim 1, wherein the first bottom panel member and the first end member each include a groove to at least partially house the first window member; and
wherein the second bottom panel member and the second end member each include a groove to at least partially house the third window member.

14. The assembly of claim 1, wherein the rear side of the base member includes a slit that is configured and dimensioned to allow a divider member to be positioned within the base member via the slit, thereby providing two separate enclosed areas after the divider member is positioned within the base member via the slit.

15. The assembly of claim 14, wherein the bottom side and an interior of the front side of the base member includes a notch that is configured to house at least a portion of the divider member.

16. A method for fabricating a pet enclosure assembly comprising:
providing a base member having a top side, front side, bottom side and a rear side;
mounting a handle member with respect to the base member;
movably securing first and second bottom panel members with respect to the base member;
movably securing a first end member with respect to the first bottom panel member, and movably securing a second end member with respect to the second bottom panel member;
movably securing, via one or more hinges, first and second lid members to the top side of the base member;
moving the first and second bottom panel members, the first and second end members, and the first and second lid members to a first position to allow a user to position: (i) first and second window members relative to the first bottom panel member and the first end member, and (ii) third and fourth window members relative to the second bottom panel member and the second end member; and
moving the first and second lid members to a second position to allow the user to: (i) releasably secure the first lid member to the first end member to define an enclosed space between the first lid member and the first and second window members positioned relative to the first bottom panel member and the first end member, and (ii) releasably secure the second lid member to the second end member to define an enclosed space between the second lid member and the third and fourth window members positioned relative to the second bottom panel member and the second end member.

17. The method of claim 16 further comprising:
moving the first and second lid members to a third position to allow the user to: (i) remove the first and second window members away from the first bottom panel member and the first end member, and (ii) remove the third and fourth window members away from the second bottom panel member and the second end member, (iii) fold the first and second end members proximal to the first and second bottom panel members, and (iv) fold the first and second bottom panel members, along with the folded first and second end members, proximal to the base member; and
moving the first and second lid members to a fourth position to allow the user to fold the first and second lid members proximal to the base member to define a transportable configuration for the user.

18. A pet enclosure assembly comprising:
a base member having a top side, front side, bottom side and a rear side;
a handle member mounted with respect to the top side of the base member;
first and second bottom panel members movably secured, via one or more hinges, to the bottom side of the base member;
a first end member movably secured, via one or more hinges, to a terminal end of the first bottom panel member, and a second end member movably secured, via one or more hinges, to a terminal end of the second bottom panel member; and
first and second lid members movably secured, via one or more hinges, to the top side of the base member;
wherein the first and second bottom panel members, the first and second end members, and the first and second lid members are configured to be moved by a user to a first position to allow the user to position: (i) first and second window members relative to the first bottom panel member and the first end member, and (ii) third and fourth window members relative to the second bottom panel member and the second end member;
wherein the first and second lid members are configured to be moved by a user to a second position to allow the user to position: (i) the first lid member releasably secured to the first end member to define an enclosed space between the first lid member and the first and second window members positioned relative to the first bottom panel member and the first end member, and (ii) the second lid member releasably secured to the second end member to define an enclosed space between the second lid member and the third and fourth window members positioned relative to the second bottom panel member and the second end member;
wherein the first and second lid members are configured to be moved by a user to a third position to allow the user to: (i) remove the first and second window members away from the first bottom panel member and the first end member, and (ii) remove the third and fourth window members away from the second bottom panel member and the second end member, (iii) fold the first and second end members proximal to the first and second bottom panel members, and (iv) fold the first and second bottom panel members, along with the folded first and second end members, proximal to the base member; and wherein the first and second lid members are configured to be moved by a user to a fourth position to allow the user to fold the first and second lid members proximal to the base member to define a transportable configuration for the user.

* * * * *